United States Patent Office 3,594,331
Patented July 20, 1971

3,594,331
METHOD OF INCREASING THE THERMAL STABILITY OF CRYSTALLINE ZEOLITES
Curtis H. Elliott, Jr., Baltimore, Md., assignor to W. R. Grace & Co., New York, N.Y.
No Drawing. Filed Feb. 27, 1969, Ser. No. 803,117
Int. Cl. B01j *11/78*
U.S. Cl. 252—442                    12 Claims

ABSTRACT OF THE DISCLOSURE

Methods of increasing the thermal stability of crystalline zeolites are disclosed. The methods are characterized by the steps of treating the crystalline zeolite with a dilute solution of a fluorine compound whereby a very small amount of fluoride is incorporated in the zeolite.

BACKGROUND OF THE INVENTION

(1) Field of the invention

This invention relates to methods of increasing the thermal stability of crystalline zeolites. In one aspect the invention relates to methods of increasing the thermal stability of crystalline zeolites that are particularly thermally unstable such as for example those characterized as Type A and Type X. In a further aspect the invention relates to a method of treating crystalline zeolites with a mild solution of soluble fluorine compound.

(2) Prior art

Molecular sieves are crystalline metal aluminosilicates having a three-dimensional interconnecting network structure of silica and alumina tetrahedra. The tetrahedra are formed by four oxygen atoms surrounding a silicon or aluminium atom. This structure permits a neat chain arrangement of building tetrahedra uniformly in 4 directions. Since oxygen atoms have 2 negative charges while the silicon atoms have 4 positive charges and the aluminum atoms have 3 positive charges, the trivalency of the alumina causes the alumina tetrahedral to be negatively charged, thus requiring an additional positive charge to balance the system. In the usual synthesized form this charge is usually supplied by a sodium or potassium cation, most frequently a sodium cation. These charge balancing cations are exchangeable ions and can be exchanged with other cations.

Also up to half the quadravalent silicon atoms in the zeolite crystal structure can be replaced by trivalent alumina atoms. Thus, by regulating the ratios of the starting materials used to prepare the zeolites it is possible to produce zeolites containing different ratios of silica:alumina having essentially the same crystal structure and as well as zeolites having different structures.

The crystalline zeolites, particularly those designated as Types A, X, and Y, have become widely acclaimed for their value as selective adsorbents and catalysts. The ability to selectively adsorb molecules based on their kinetic molecular size, diameter and polarity is attributed to their unique crystal structure which affords a series of uniformly sized pore openings which permit molecules having smaller kinetic molecular diameters than the pore opening to pass into the interior of the zeolite while excluding larger molecules.

For example, in the crystalline zeolite designated as Type A the tetrahedral are grouped to form a truncated octahedron with a silica or alumina tetrahedron at each point. This structure is known as a sodalite cage, which in itself contains a small cavity which is of no practical significance since the largest openings are not large enough to permit even the entrance of the smallest molecules. However, when the sodalite cages are stacked in simple cubic forms, as they are in the Type A zeolite, the result is a network of cavities approximately 11.5 A, in diameter, which is accessible through openings on all 6 sides. These openings are surrounded by 8 oxygen ions and are partially blocked by the exchangeable charge balancing in the cation. Thus, by substituting different cations for the balancing cations, zeolites of different pore size openings and therefore selectivity, can be obtained. In the usual, synthesized sodium cation Type A zeolite the oxygen atom rings provide openings of about 4.2 A, in diameter. By exchanging the sodium cation, or preparing the zeolite, with potassium ions the pore opening will be reduced to 3 A. Similarly by ion exchanging the sodium ion with a divalent cation the pore opening can be increased, (e.g., the calcium form Type A has a pore opening of about 5 A. in diameter) since only half as many cations will be required to balance the negative charge.

The crystalline zeolites are formed with a large amount of water of hydration which fills the cavities. Fortunately this water of hydration is losely bound and can be easily removed by moderate heating. The zeolite is then free to adsorb molecules of the correct kinetic molecular diameter and polarity into these cavities.

Another zeolite which has become of particular interest to the art is referred to as faujasite. This encompasses the zeolites designated Type X and Y. These zeolites have a crystalline structure similar to that of Type A in that they also are made up of the basic sodalite building blocks. However, in this case, the sodalite cages are arranged in a tetrahedron relationship (diamond structure) with bridging across the 6 membered hexagonal rings thereby forming a 12 membered oxygen atom ring. These rings provide pore openings of about 9–10 A. in diameter. As with the Type A structure the overall electrical charge is balanced by a positively charged exchangeable cation. The faujasite zeolites, as well as being a very desirable selective adsorbent, are also highly regarded by the art for their catalytic activity especially with regard to the promotion of reactions used in upgrading petroleum hydrocarbons. The zeolites designated Types A, X and Y are also referred to by the prior art, as Z–12, Z–14 and Z–14 HS, respectively.

Unfortunately the crystal structures of many of the zeolites do not have sufficient thermal stability to withstand the regeneration temperatures typically used in many adsorption and catalyst systems. This thermal instability is especially acute in the zeolites having lower silica-alumina ratios such as for example, Types A and X, and represents a substantial problem even in those zeolites having a higher silica-alumina ratio such as for example, Type Y. The prior art is replete with various methods which propose to solve or alleviate this thermal unstability; some which are more successful than others. One particularly successful method of increasing the thermal stability of the Type Y zeolite is disclosed in U.S. Patent 3,293,192. While the process disclosed in this patent produces an unusually stable product, it requires accurate control and a number of exchange steps and at least one high temperature calcination step. In many cases the product produced by this process possesses a thermal stability greater than is required, especially where the zeolite is to be used as an adsorbent and thus will not encounter the high temperatures required in coke removal catalyst regeneration cycles. Applicant has therefore discovered a simple and inexpensive process for increasing the thermal stability of crystalline zeolites in general, and which notably affords the low silica-alumina ratio zeolites, such as for example, Types A and X, greatly increased thermal stability in the intermediate temperature ranges of about 1200–1425° F. Thus, applicant's invention substantially increases both the life of these zeolites and the range of processes in which they can be used.

OBJECTS AND SUMMARY

Objects

It is therefore an object of the invention to provide a method of increasing the thermal stability of crystalline zeolites and especially those zeolites having low silica to alumina ratios. It is a further object of the invention to provide a zeolite composition of matter having increased thermal stability.

It is a still further object of the invention to provide a method of treating crystalline zeolites with a dilute solution of a fluoride compound to increase thermal stability. It is also an object of the invention to provide a crystalline zeolite composition matter containing a very small amount of fluoride incorporated into its structure.

Other additional objects will become apparent and in part obvious from the following description and the appended claims.

Summary

In summary, the method of my invention comprises treating a crystalline zeolite with a dilute solution, typically an aqueous solution, of a fluorine compound in a sufficient quantity to provide about 2 to 22 grams of available fluoride per 10,000 grams of zeolite (dry dehydrated basis). By available fluoride I mean the fluoride which is disassociated and available to combine with the zeolite. Thus for example, although ammonium fluosilicate has six atoms of fluorine per molecule, four of these atoms will be too strongly attracted to the silicate atom, even in solution, to become available. The pH of the solution should be within the range of about 6 to 11 as pH's below 6 can attack the zeolite. The temperature of the solution normally should be within the range of 60 to 130° F., however, both higher and lower temperatures can be used-within, of course, the freezing and boiling limits of the solution. I have found best results to be obtained with pH's of from 7 to 10. Virtually any soluble fluorine salt can be used as the source of fluoride, the only limitation being that the salt will dissolve to yield some amount of available fluoride ions. Suitable fluorine compounds which can be used include ammonium fluosilicate, sodium fluosilicate, ammonium fluoride, sodium fluoride, potassium fluoride and the like.

In summary the composition of my invention comprises a crystalline zeolite composition containing about 2 to 15 grams of unwashable fluoride ion per 10,000 grams of the crystalline zeolite (dry dehydrated bases) and a thermal stability of at least 1.15 times that of the untreated zeolite in the temperature ranges of substantial intermediate collapses.

DETAILED DESCRIPTION OF THE INVENTION AND THE PREFERRED EMBODIMENTS

The aforementioned, and other, objects can be accomplished by my invention a detailed description of which will herein follow.

The first step of my process comprises selecting the particular crystalline zeolite which it is desired to stabilize. The method of preparing the crystalline zeolite is not a part of my invention and such methods can be found in the prior art. Suitable crystalline zeolites which may be stabilized according to my invention are listed in the following table, including their respective chemical compositions and patent references disclosing typical methods of preparing such zeolites.

TABLE A

| Zeolite | Oxide mole ratios (shown as alkali metal oxide form) | Patent disclosures |
| --- | --- | --- |
| Zeolite X | $1.0 \pm 0.2 Na_2O : Al_2O_3 : 2.5 \pm 0.5 SiO_2 : 0\text{-}8H_2O$ | U.S. 2,882,244. |
| Zeolite Y | $0.9 \pm 0.2 Na_2O : Al_2O_3 : 3\text{-}6SiO_2 : 0\text{-}9H_2O$ | U.S. 3,130,007. |
| Zeolite A | $1.0 \pm 0.2 Na_2O : Al_2O_3 : 1.85 \pm 0.5 SiO_2 : 0\text{-}6H_2O$ | U.S. 2,882,243. |
| Zeolite L | $1.0 \pm 0.1 Na_2O : Al_2O_3 : 6.4 \pm 0.5 SiO_2 : 0\text{-}7H_2O$ | Belg. 575,117. |
| Zeolite D | $0.9 \pm 0.2[(0\text{-}1)Na_2O : (1\text{-}0)K_2O] : Al_2O_3 : 4.5\text{-}4.9 SiO_2 : 0\text{-}7H_2O$ | Canad. 611,981. |
| Zeolite R | $0.9 \pm 0.2 Na_2O : Al_2O_3 : 2.45\text{-}3.65 SiO_2 : 0\text{-}7H_2O$ | U.S. 3,030,181. |
| Zeolite S | $0.9 \pm 0.2 Na_2O : Al_2O_3 : 4.6\text{-}5.9 SiO_2 : 0\text{-}7H_2O$ | U.S. 3,054,657. |
| Zeolite T | $1.1 \pm 0.4[(0.1\text{-}0.8)Na_2O : (0.9\text{-}0.2)K_2O] : Al_2O_3 : 6.9 \pm 0.5 SiO_2 : 0\text{-}8H_2O$ | U.S. 2,950,952. |
| Zeolite Z | $K_2O : Al_2O_3 : 2SiO_2 : 0\text{-}3H_2O$ | Canad. 614,995. |
| Zeolite E | $0.9 \pm 0.1 Na_2O : Al_2O_3 : 1.95 \pm 0.1 SiO_2 : 0\text{-}4H_2O$ | Canad. 636,931. |
| Zeolite F | $0.95 \pm 0.15 Na_2O : Al_2O_3 : 2.05 \pm 0.3 SiO_2 : 0\text{-}3H_2O$ | U.S. 2,996,358. |
| Zeolite O | $0.95 \pm 0.05 Na_2O : Al_2O_3 : 12.2 \pm 0.05 SiO_2 : 0\text{-}5H_2O$ | U.S. 3,140,252. |
| Zeolite B | $1.0 \pm 0.2 Na_2O : Al_2O_3 : 3.5 \pm 1.5 SiO_2 : 0\text{-}6H_2O$ | U.S. 3,008,803. |
| Zeolite Q | $0.95 \pm 0.05 Na_2O : Al_2O_3 : 2.2 \pm 0.05 SiO_2 : XH_2O$ | U.S. 2,991,151. |
| Zeolite M | $1.0 \pm 0.1 K_2O : Al_2O_3 : 2.0 \pm 0.1 SiO_2 : XH_2O$ | U.S. 2,995,423. |
| Zeolite H | $1.0 \pm 0.1 Na_2O : Al_2O_3 : 2.0 \pm 0.1 SiO_2 : XH_2O$ | U.S. 3,010,789. |
| Zeolite J | $0.9 \pm 0.1 K_2O : Al_2O_3 : 2.1 \pm 0.2 SiO_2 : XH_2O$ | U.S. 3,011,869. |
| Zeolite W | $1.0 \pm 0.1 Na_2O : Al_2O_3 : 4.1 \pm 0.8 SiO_2 : YH_2O$ | U.S. 3,012,853. |
| Zeolite KG | $0.9\text{-}1.1 Na_2O : Al_2O_3 : 2.3\text{-}4.2 SiO_2 : 2.6\text{-}4.6 H_2O$ | U.S. 3,056,654. |

My inventive process can also be used to stablize naturally occurring zeolites such as for example, levynite, dachiardite, erionite, taujasite, analcite, paulingite, noselite, ferriorite, heulandite, scolecite, stibite, clinoptilolite, harmotome, phillipsite, brewsterite, flakite, datolite, and alumino-silicates represented as follows:

Chabazite, $Na_2O.Al_2O_3.4SiO_2.6H_2O$
Gmelinite, $Na_2O.Al_2O_3.4SiO_2.6H_2O$
Cancrinite, $3(Na_2O.Al_2O_3.2SiO_2).Na_2CO_3$
Leucite, $K_2O.Al_2O_3.4SiO_2$
Lazurite, $(Na,Ca)_8Al_6Si_6O_{24}4.2(S,Cl,SO_4)$
Scaplite, $Na_4Al_3Si_9O_{24}.Cl$
Mesolite, $Na_2O.Al_2O_3.3SiO_2.2\text{-}3H_2O$
Ptilolite, $Na_2O.Al_2O_3.10SiO_2.4H_2O$
Mordenite, $Na_2O.Al_2O_3.10SiO_2.6.6H_2O$
Nepheline, $Na_2O.Al_2O_3.2SiO_2$
Natrolite, $Na_2O.Al_2O_3.3SiO_2.2H_2O$
Sodalite, $3(Na_2O.Al_2O_3.2SiO_2).2NaCl$ The selected crystalline zeolite is slurried with a solution containing about .02 to .22 gram of available fluoride per 100 grams of zeolite (dry dehydrated basis) and having a slurry pH in about the range of 6 to 11. By available fluoride I mean the fluoride which is disassociated and available to combine with the zeolite. Thus for example, although ammonium fluosilicate has six atoms of fluorine per molecule, four of these atoms will be too strongly attracted to the silicate atom, even in solution, to become available. Typically the solution will have a fluoride concentration of about .1 to 5 g./liter, however the important limitations are the pH of the slurry and the relative ratio of available fluoride to zeolite. Typically, and conveniently, the fluoride solution will be an aqueous solution though other solvents for fluorine salts could be used. Suitable fluorine compounds which can be used include, for example, ammonium fluosilicate, sodium fluosilicate, ammonium fluoride, sodium fluoride, potassium fluoride and the like. Other fluorine salts could be used provided they will dissolve in a suitable solvent, preferably water, to yield available fluoride ion. Particular care must be observed to ensure that the pH of the slurry is maintained above 6 since pH's below about 5 to 6, depending upon the particular zeolite and the relative percent H+ ion exchange incident to that type of zeolite, cause deterioration of the crystal structure, severe loss of thermal stability, and with pH's below 3 cause disintegration of the zeolite through the dissolution of alumina. Especially good results are obtained with ammonium fluosilicate (i.e., $(NH_4)_2 SiF_6$). Further ammonium fluosilicate is a particularly desirable salt for industrial application since it is easily prepared, and easily handled.

Ambient solution temperatures can be used in our process though temperatures both below and above this can also be used—such as for example, are dictated by considerations of the solubility of the fluorine compound and whether its solution is more active in attacking zeolite structure at higher temperatures than at lower temperatures. Conveniently solution temperatures in the range of about 60 to 130° F. can be used. But both higher and lower solution temperatures can also be used. Pressures greater than atmospheric pressure can also be used. The fluoride solution should be allowed to contact the zeolite for a sufficient time to mix with and diffuse into the zeolite. Typical contact times are about at least 5 minutes and preferably about 15 minutes to 1 hour. Mechanical mixing means can also be desirably used to expedite mixing. The treated zeolite is then removed from the solution by any appropriate means such as for example, filtration or centrifugation, and then dried. Our thermal stabilization treatments can also be used in a combined washing and stabilization step in the initial manufacture of the zeolite. The stabilized zeolite can then be given a mild calcination at a temperature of 600 to 1000° F. to activate (i.e. remove the hydrated water and adsorbed water), or it can be activated within the actual adsorption or catalytic unit.

The resulting compositions of my invention are crystalline zeolites having an increased thermal stability and containing about from 2 to 15 grams of fluoride per 10,000 grams of zeolite, incorporated within the zeolite. It is critical that the amount of fluoride incorporated within the zeolite be maintained within these limits since a greater amount of fluoride will actually reduce the thermal stability of the zeolite and in some instances actually cause destruction of the crystal structure. Similarly if the minimal quantity of fluoride required above is not incorporated into the zeolite, the zeolite will not exhibit any appreciable, if any, increase in thermal stability. The stabilized zeolites of my invention posses a crystallinity retention, in the temperature ranges of intermediate crystalline collapse, of at least 1.15 times that of the untreated zeolites. Typically this increase is stability ranges from about 1.15 to 3 times that of the untreated zeolite. By temperature ranges of intermediate collapse I mean temperature ranges in which the untreated zeolite experiences a substantial lost of crystallinity but still retains a substantial portion of its crystallinity. This temperature range can thus be considered as intermediate between the lower temperature range in which the zeolite experiences very little if any crystalline collapse and those higher temperature ranges in which the zeolite experiences loss of upwards of 90% of its crystallinity. Thus, for example, a commercial sodium cation Z-14 zeolite will have an initial surface area of around 800 m.$^2$/g. and will start to experience collapse at temperatures of about 1200° F. and after calcination for 2 hours at 1400° F. the surface area will be reduced to about 500 to 550 m.$^2$/g. If the calcination is effected at 1425° F. the surface area will be reduced to around 200 to 250 m.$^2$/g., which though representing a substantial loss of surface area, is still considered to represent a substantial amount of surface area. If the zeolite is calcined at 1450° F. the surface area will be reduced to around 15 to 20 m.$^2$/g. indicating in effect, complete loss of crystallinity. Thus for a sodium Z-14 zeolite the temperature range of intermediate crystalline collapse, and in which range the zeolite composition of my invention has increased crystalline thermal stability would be from about 1250° to 1435° F. Since the various zeolites have different thermal stabilities the temperature range of intermediate crystalline collapse will vary for the particular type zeolite. Thus, for example, a sodium cation Z-12 crystalline zeolite will start to experience crystalline collapse at temperatures in the range about 1100° to 1200° F. and suffer virtually complete loss of crystallinity at temperatures of about 1400° F. Thus, I have ascertained the intermediate crystalline collapse temperature range for a sodium cation Z-12 zeolite to be about 1250 to 1390° F. It should also be noted that crystallinity for sodium Z-12 zeolites must be measured in terms of X-ray crystallinity since the pore sizes of this zeolite are too small to permit entrance of the nitrogen molecular and thus preclude conventional surface area measurements which are necessarily based upon the adsorption of nitrogen.

Further since the particular cation form of the zeolite will influence thermal stability, the intermediate crystalline collapse temperature range will also vary, even for a given type of zeolite, depending upon its cation form. Thus, for example, a 50% ammonium exchanged sodium Z-14 zeolite has substantially less thermal stability than an essentially 100% sodium cation Z-14 zeolite and will have an intermediate crystalline collapse temperature range of about 1000 to 1220° F., as compared to 1250 to 1435° F. for the essentially pure sodium cation form.

While the reason for the enhanced thermal stability of my zeolite composition is not clearly known, I have theorized from the fact that the quantities of fluoride required to increase stability approximate—though perhaps coincidentally—the chemical equivalent of basic structural $Na_2O$ (i.e. the constructional sodium oxide which supplies the necessary electromagnetic force or balance to hold the primary sodalite cages together) and from the fact that substantially more fluoride than the chemical equivalent amount appears to attack constructional alumina or silica, that the chemical equivalent fluoride in some manner becomes attached to the constructional alkali metal (usually sodium) oxide thereby reducing the fluxing action of the basic structural $Na_2O$ which would otherwise result in the collapse of the crystal structure.

In practice the affect of fluoride concentration appears to have three stages; a first stage in which the constructional alkali oxide sites are either partially or completely satisfied, thereby increasing the thermal stability of the zeolite; a second stage where the amount of fluoride exceeds satisfaction of the constructional alkali oxide sites, in this stage the excess fluoride can be removed by washing; and a third stage wherein the fluoride concentration is so high, that fluoride ions are indiscriminately attached all over the sieve causing de-crystallization by direct attack of the construction alumina and silica sites.

Further proof of this theory appears to be evidenced by the fact that small amounts of fluoride impurities which are introduced as an impurities in the reactants during the preparation of the zeolite do not increase the thermal stability of the zeolites. In this case the zeolite crystals merely occlude, or build up around, the fluoride impurity and thus the fluoride does not attach to or tie-up the constructional alkali metal oxide sites. Thus, the fact that the fluoride impurity here has little or no effect would tend to further substantiate the theory that fluoride increases the thermal stability by reducing the fluxing action of construction alkali oxide.

However, since the exact structural relationship of the stabilizing fluoride ions to the zeolite is not known with certitude I have designated these ions simply as unwashable fluoride ions, since they cannot be removed from the zeolite by normal washing.

A further understanding of my invention can be had from the following non-limiting examples.

Example 1.—This example illustrates a method according to my invention of increasing the thermal stability of a Type X sodium zeolite having a 115% X-ray crystallinity and 24.92 A. cell size—designated as Code 540 13X–Na, by the Davison Division of W. R. Grace & Co.

An aqueous ammonium fluorsilicate solution containing 2 grams of $(NH_4)_2SiF_6$ per 500 ml. of solution was prepared. 100 grams (dry basis) of 13X–Na zeolite was slurried in 100 ml. of water in a Teflon-lined vessel. 50 ml. of the aforementioned ammonium fluosilicate was then added to the slurry with stirring. The slurry was then stirred for 10 minutes at 70° F. The so treated zeolite was then recovered by filtration and dried over-night at a temperature of 200–300° F. The filter cake was not washed prior to drying.

Additional examples were prepared following the same procedure but using different quantities and concentrations of the ammonium fluosilicate solution. The thermal stability of the resulting samples was then tested at 1400° F. and at 1425° F. A summary of these examples appears below in Table 1.

a Type A sodium crystalline zeolite designated as Z–12–Na molecular sieve by the Davison Division of W. R. Grace & Co.

In this example an aqueous ammonia fluosilicate solution containing 10 grams of $(NH_4)_2SiF_6$ per liter of solution was prepared. 500 grams (dry basis) of Z–12–Na zeolite was slurried in 2000 ml. of water in a teflon-lined vessel. 50 ml. of the aforementioned ammonium fluosilicate solution was then added to the slurry with stirring. The slurry was then stirred for 15 minutes at ambient temperature. The treated slurry was then filtered and the resulting filter cake dried overnight at about 250° F. The filter cake was not washed prior to drying.

A series of examples prepared in the same manner as above but using different quantities of ammonium fluosilicate were also made. These examples were then tested for thermal stability by comparing the crystallinities, of the respective examples, retained after being cal-

TABLE 1

| Sample | A | B | C | D | E | F | G | H | I | J | K | L |
|---|---|---|---|---|---|---|---|---|---|---|---|---|
| Z–14–Na zeolite, D.B.* g | 500 | 500 | 500 | 500 | 500 | 500 | 500 | 100 | 100 | 100 | 100 | 100 |
| Water for slurrying, ml | 2,000 | 2,000 | 2,000 | 2,000 | 2,000 | 2,000 | 2,000 | 1,000 | 1,000 | 1,000 | 1,000 | 1,000 |
| $(NH_4)_2SiF_6$ solution, ml | 0 | 50 | 100 | 200 | 300 | 500 | 900 | 50 | 100 | 150 | 250 | 450 |
| $(NH_4)_2SiF_6$ conc. of solution g./l | | 10 | 10 | 10 | 10 | 10 | 10 | 4 | 4 | 4 | 4 | 4 |
| Grams $(NH_4)_2SiF_6$ | 0 | 0.5 | 1.0 | 2.0 | 3.0 | 5.0 | 9.0 | 0.2 | 0.4 | 0.6 | 1.0 | 1.8 |
| pH of $(NH_4)_2SiF_6$ solution | | 4.0 | 4.0 | 4.0 | 4.0 | 4.0 | 4.0 | 4.2 | 4.2 | 4.2 | 4.2 | 4.2 |
| pH of treated slurry | 10.4 | 10.2 | 10.0 | 9.6 | 9.3 | 8.7 | 8.5 | 10.1 | 9.7 | 9.5 | 9.0 | 7.5 |
| T.V. at 1,000° F., oven dried cake, wt. percent | 20.28 | 20.12 | 20.34 | 19.79 | 19.62 | 19.23 | 18.93 | 20.46 | 20.57 | 20.71 | 20.14 | 20.28 |
| Wt. percent F, D.B.* at 1,000° F | 0.031 | 0.055 | 0.055 | 0.044 | 0.110 | 0.044 | 0.260 | 0.072 | 0.96 | 0.12 | 0.055 | 0.182 |
| Surface area, sq.m./gm.: | | | | | | | | | | | | |
| 2 hrs. at 1,400° F | 530 | 767 | 757 | 767 | 779 | 762 | 135 | | Not tested | | | |
| 2 hrs. at 1,425° F | 226 | 654 | 631 | 592 | 641 | 653 | | 645 | 618 | 639 | 616 | 566 |
| 2 hrs. at 1,450° F | 17 | 10 | 9 | 12 | 12 | 39 | 1 | | Not tested | | | |
| Comparison of crystallinity (surface area) retained as percent of untreated Z–14–Na (i.e. Sample A) at each level of temperature activation: | | | | | | | | | | | | |
| 2 hrs. at 1,400° F | 100 | 145 | 143 | 145 | 147 | 144 | 25 | | | | | |
| 2 hrs. at 1,425° F | 100 | 289 | 219 | 262 | 284 | 289 | 0 | 285 | 274 | 283 | 273 | 250 |
| 2 hrs. at 1,450° F | | | | Amorphous—no appreciable crystallinity | | | | | | | | |

*Dry basis.

It can be seen from the above table that the thermal stability of the zeolite is increased by using fluoride contents of about from .045 to about .15 wt. percent but decreased when a fluoride content of .18 wt. percent is exceeded. Optimum thermal stability being obtained in the above example at a fluoride content of about .05 to .13 wt. percent. It should also be noted that the untreated sample of zeolite, Example A, contained 0.031 wt. percent fluoride as an impurity, introduced during the formation of the initial zeolite, and that this fluoride impurity did not increase the thermal stability. The inconsistency in fluoride contents in Sample D and F can be accounted for by possible errors in improper mixing or fluoride contact in the zeolite slurry. The increase in stability for this example ranged from about 1.4 to 3 times that of the untreated zeolite.

Example 2.—This example illustrates a method according to our invention of increasing the thermal stability of cined respectively at 1100° F., 1200° F., and 1375° F. A summary of these examples—their analysis and method of preparation and the results of the calcination test is found in the following Table 2.

TABLE 2

| | Non-treated Code 510 Z–12–Na | Sample | | | | | |
|---|---|---|---|---|---|---|---|
| | | A | B | C | D | E | F |
| Z–12–Na, dry basis g | 500 | 500 | 500 | 500 | 500 | 500 | 500 |
| Water for slurrying, ml | 2,000 | 2,000 | 2,000 | 2,000 | 2,000 | 2,000 | 2,000 |
| $(NH_4)_2SiF_6$ solution (10 g. $(NH_4)_2SiF_6$ per liter pH=3.7) ml | None | 50 | 100 | 200 | 300 | 500 | 900 |
| Slurry pH after 15 minutes | 10.8 | 10.2 | 9.9 | 9.5 | 9.3 | 9.1 | 8.7 |
| Slurry temperature, °F | 89 | 89 | 83 | 81 | 84 | 90 | 83 |
| T.V. of oven dried material, wt. percent | 15.53 | 14.65 | 14.12 | 14.20 | 13.78 | 14.27 | 13.83 |
| Fluoride, wt. percent, dry basis | 0.020 | 0.045 | 0.095 | 0.099 | 0.102 | 0.128 | 0.150 |
| X-ray evaluation after activation; unit total of 4 peaks: | | | | | | | |
| 2 hrs. at 1,100° F | 240 | 239 | 249 | 249 | 258 | 258 | 253 |
| 2 hrs. at 1,200° F | 249 | 249 | 247 | 253 | 251 | 256 | 254 |
| 2 hrs. at 1,375° F | 87 | 100 | 102 | 114 | 126 | 103 | 29 |
| Comparison of crystallinity retained as percent of non-fluoride treated standard code 510 Z–12–Na at each level of temperature activation: | | | | | | | |
| 2 hrs. at 1,100° F | 100 | 100 | 104 | 104 | 108 | 108 | 105 |
| 2 hrs. at 1,200° F | 100 | 100 | 99 | 102 | 101 | 103 | 102 |
| 2 hrs. at 1,375° F | 100 | 115 | 117 | 131 | 145 | 118 | 33 |

As can be seen from the above table the thermal stability of the treated zeolite is increased for fluoride contents of from .045 to .13 wt. percent but was decreased for fluoride contents greater than about .15 wt. percent. Optimum thermal stabilities being maintained with fluoride contents of about .10 to .11 wt. percent. Again it should be noted, that the initial zeolite sample contained .02 wt. percent (dry basis) fluoride as an impurity which had been introduced during the formation of the initial zeolite and that the fluoride impurity did not increase the thermal stability of the zeolite. The increase in thermal stability for the example ranged from about 1.15 to 1.50 times that of the untreated zeolite.

Example 3.—This example illustrates a method according to our invention of increasing the thermal stability of partially ammonia exchanged Z–14 (Type X) sodium cation crystalline zeolites having about ⅔'s of the initial sodium cation replaced by ammonium cation and having a silica to alumina ratio in the range of about 2.5 to 2.65.

In this example identical 240 grams slurry samples containing 103 grams (dry basis) of sodium cation Z–14 crystalline zeolite and the remainder of water was respectively slurried, with mixing in a solution, at a temperature of 120° F., of 700 ml. of water containing 100 grams of ammonium sulfate and the respective quantity of ammonium fluosilicate ($(NH_4)_2SiF_6$) indicated for that sample in Table 3 hereinbelow. The slurry pH was then measured and mixing continued for 15 minutes, after which time the slurry was filtered. The resulting filter cake was then reslurried, with mixing, in a second solution, also at 120° F., of 700 ml. of water containing 100 grams of ammonium sulfate and the respective amount of ammonium fluosilicate indicated for that sample in Table 3. The pH of the slurry was measured and mixing continued for 15 minutes. The slurry was then filtered and the resulting filter cake washed free of sulfate with water. The washed cake was then dried.

The thermal stabilities of these samples were then evaluated by determining and comparing the crystallinities of the samples after activation by calcination at 800° F. for ½ hour and the crystallinity and surface area of the samples after calcination at 1200° F. for 2 hours.

A summary of the results of these samples and their thermal stability tests is found in the following Table 3.

the amount of fluoride which can be tolerated by the zeolite without substantial loss of crystallinity also remains unchanged although the wt. percent of fluoride increases because of the decreases in molecular weight of the zeolite. The increase in thermal stability for this ranged from about 1.30 to 1.45 times that of the untreated zeolite.

Obviously, many modifications and variations of the invention described hereinabove and in the appended claims can be made without departing from the essence and scope thereof.

I claim:

1. A method of preparing a fluoride treated stabilized crystalline aluminosilicate zeolite composition having an increased thermal stability which comprises:
   (a) contacting a crystalline aluminosilicate zeolite with a sufficient quantity of a solution of a soluble fluorine salt, which in solutions, yields available fluoride ions, to provide about from 2 to 22 grams of available fluoride per 10,000 grams, dry basis, of zeolite, and a solution pH in contact with the zeolite of about from 6 to 11 for a sufficient length of time to allow said solution to thoroughly contact and diffuse into said zeolite,
   (b) separating, and drying the stabilized zeolite product.

2. The process of claim 1 wherein said zeolite is contacted with the solution by slurrying the zeolite in said solution at a temperature of about 60 to 130° F. for at least 5 minutes.

3. The process of claim 1 wherein said soluble fluorine compound is selected from the group consisting of ammonium fluosilicate, sodium fluosilicate, ammonium fluo-

TABLE 3

| | Sample number | | | | | |
|---|---|---|---|---|---|---|
| | I | II | III | IV | V | VI |
| Na Z–14 zeolite slurry, g | 240 | 240 | 240 | 240 | 240 | 240 |
| Na Z–14 zeolite, D.B.*, g | 103 | 103 | 103 | 103 | 103 | 103 |
| Na Z–14 zeolite slurry, pH | 9.9 | 9.9 | 9.9 | 9.9 | 9.9 | 9.9 |
| 1st exchange: | | | | | | |
| $(NH_4)_2SO_4$, g | 100 | 100 | 100 | 100 | 100 | 100 |
| $H_2O$, cc | 700 | 700 | 700 | 700 | 700 | 700 |
| $(NH_4)_2SiF_6$, g | 0 | 0.1 | 0.25 | 0.50 | 1.00 | 3.0 |
| Exchange slurry, pH | 8.1 | 8.0 | 7.9 | 7.8 | 7.7 | 7.6 |
| 2d exchange: | | | | | | |
| $(NH_4)_2SO_4$, g | 100 | 100 | 100 | 100 | 100 | 100 |
| $H_2O$, cc | 700 | 700 | 700 | 700 | 700 | 700 |
| $(NH_4)_2SiF_6$, g | 0 | 0.1 | 0.25 | 0.50 | 1.00 | 3.0 |
| Exchange slurry, pH | 7.4 | 7.3 | 7.1 | 7.0 | 7.0 | 7.0 |
| Final product analysis: | | | | | | |
| $Na_2O$, D.B., percent wt | 6.32 | 6.24 | 6.15 | 6.28 | 6.56 | 6.96 |
| F, D.B., percent wt | <.01 | .022 | .041 | .065 | .18 | .83 |
| Activated at 800° F. for ½ hour: | | | | | | |
| X-ray crystallinity, percent | 15 | 40 | 40 | 38 | 49 | |
| Cell size, A | 24.86 | 24.87 | 24.90 | 24.87 | 24.91 | |
| Activated at 1,200° F. for 2 hours: | | | | | | |
| X-ray crystallinity, percent | Amorphous | 26 | 22 | 21 | 22 | Amorphous |
| S.A., m.²/g | 286 | 414 | 405 | 389 | 375 | 0 |
| Percent surface area retained based on untreated sample (i.e. Sample I, S.A.=286) | 100 | 145 | 142 | 136 | 131 | 0 |

*D.B.=Dry basis.

It can be seen from the above table the thermal stability of the zeolite was increased by using fluoride contents of about from .02 to about .18 wt. percent but decreased when a fluoride content of .20 wt. percent was exceeded. Optimum thermal stability being obtained in the above example at a fluoride content of about .02 to .06 wt. percent. This increase in wt. percent of fluoride which can be retained by the zeolite without substantial loss of crystallinity can be partially attributable to the reduction in molecular weight of the crystal unit because of the substitution of $NH_4^+$ (M.W. 18) for $Na^+$ (M.W. 23) and also loss through the conversion of $NH_4^+$ cation to $H^+$ cation (M.W. 1) which occurs during the activation (dehydration) calcination prior to measurement. The amount of constitual $Na^+$ in the sodalite cages is, of course, not affected by the ion exchange removal of a portion of the mobile ion. Thus the amount of fluoride required to tie up the constitual $Na^+$ in the sodalite and ride, sodium fluoride, potassium fluoride and mixtures thereof.

4. The process of claim 3 wherein said soluble fluorine salt is ammonium fluosilicate.

5. The process of claim 1 wherein said crystalline zeolite is selected from the group consisting of Z–12 zeolites and Z–14 zeolites.

6. The method of claim 1 wherein the fluoride treated crystalline aluminosilicate zeolite has about .01 to .15 wt. percent unwashable fluoride ions and has a crystalline thermal stability in the temperature range of intermediate crystalline collapse of at least 1.15 times that of the respective untreated zeolite.

7. The process of claim 6 wherein said zeolite is a Z–12 type zeolite and comprises about .45 to .13 wt. percent of unwashable fluoride ions and has a thermal stability in the temperature range of about from 1250 to 1390° F. of at least 1.15 times that of the respective untreated zeolite.

8. The composition of the process of claim 7 wherein said zeolite composition is a sodium cation zeolite and contains about .10 to .11 wt. percent of unwashable fluoride ions.

9. The process of claim 6 wherein said zeolite composition is a Z-14 zeolite and contains about .045 to .15 wt. percent of unwashable fluoride ions and has a thermal stability in the temperature range of about 1250 to 1435° F. of at 1.15 times that of the respective untreated zeolite.

10. The process of claim 9 wherein said zeolite is a sodium cation Z-14 zeolite and contains about .05 to .13 wt. percent fluoride and has a thermal stability of about from 1.4 to 2.9 times that of the respective untreated zeolite in about the temperature range of 1250 to 1435° F.

11. The process of claim 6 wherein said zeolite is about 50% ammonium cation exchanged sodium cation Z-14 zeolite containing about .02 to .15 wt. percent of unwashable fluoride ions and having a thermal stability in the temperature range of about from 1000 to 1220° F. of about from 1.30 to 1.45 times that of the respective untreated zeolite.

12. The composition of the process of claim 11 wherein the zeolite has an unwashable fluoride content of about from .02 to .06 wt. percent.

References Cited

UNITED STATES PATENTS

| | | | |
|---|---|---|---|
| 3,248,342 | 4/1966 | Elliott, Jr. et al. | 252—442 |
| 3,318,802 | 5/1967 | Martin | 252—455X |
| 3,318,821 | 5/1967 | Pollitzer et al. | 252—442 |
| 3,354,078 | 11/1967 | Miale et al. | 252—455X |

DANIEL E. WYMAN, Primary Examiner

C. F. DEES, Assistant Examiner

U.S. Cl. X.R.

252—455R, 455Z